United States Patent [19]
Rawlings

[11] Patent Number: 4,711,222
[45] Date of Patent: Dec. 8, 1987

[54] INTERNAL COMBUSTION ENGINE POLLUTANT CONTROL SYSTEM

[75] Inventor: Kelly R. Rawlings, Big Bear Lake, Calif.

[73] Assignee: Anti-P, Inc., Los Angeles, Calif.

[21] Appl. No.: 853,425

[22] Filed: Apr. 23, 1986

Related U.S. Application Data

[63] Continuation-in-part of Ser. No. 729,656, May 2, 1985, abandoned.

[51] Int. Cl.[4] .................................... F02M 31/12
[52] U.S. Cl. ............................ 123/555; 123/525; 123/549; 123/552; 123/592; 261/69.1; 261/142
[58] Field of Search ............... 123/555, 557, 552, 549, 123/525, 592; 261/142, 144, 145, 69 R

[56] References Cited

U.S. PATENT DOCUMENTS

| | | |
|---|---|---|
| 1,980,496 | 11/1934 | Musselwhite . |
| 2,205,750 | 6/1940 | Ross ............................ 123/555 |
| 2,285,905 | 6/1942 | Cunningham et al. ......... 123/557 |
| 2,306,897 | 12/1942 | Ollig ............................ 123/557 |
| 2,717,827 | 9/1955 | Best ............................ 48/144 |
| 2,884,917 | 5/1959 | Quinby . |
| 3,184,295 | 5/1965 | Baverstock ................... 123/557 |
| 3,544,290 | 12/1970 | Larson, Sr. et al. ............ 123/592 |
| 3,850,152 | 11/1974 | Hollins . |
| 3,931,800 | 1/1976 | Gendron . |
| 3,931,801 | 1/1976 | Rose et al. ................... 123/557 |
| 3,933,135 | 1/1976 | Zillman et al. . |
| 3,963,013 | 6/1976 | Authement et al. . |
| 3,968,775 | 7/1976 | Harpman ..................... 123/25 B |
| 4,020,815 | 5/1977 | Hubert ........................ 123/556 |
| 4,040,403 | 8/1977 | Rose et al. ................... 261/69 A |
| 4,092,963 | 6/1978 | Vrooman ..................... 261/142 |
| 4,106,453 | 8/1978 | Burley ......................... 261/41 A |
| 4,180,036 | 12/1979 | Wolf . |
| 4,213,433 | 7/1980 | Day ............................ 123/549 |
| 4,216,751 | 8/1980 | Davison et al. ............... 123/557 |
| 4,233,945 | 11/1980 | Beitz .......................... 123/557 |
| 4,274,383 | 6/1981 | Adams ........................ 123/523 |
| 4,303,051 | 12/1981 | Weishaar ..................... 123/557 |
| 4,306,531 | 12/1981 | Watkins ....................... 123/557 |
| 4,319,554 | 3/1982 | Buffie ......................... 123/559 |
| 4,345,141 | 8/1982 | Little .......................... 219/207 |
| 4,345,570 | 8/1982 | McNeece ..................... 123/557 |
| 4,356,805 | 11/1982 | Kler ........................... 123/557 |
| 4,362,131 | 12/1982 | Mason et al. ................. 123/41.1 |
| 4,367,718 | 1/1983 | Heine .......................... 123/557 |
| 4,370,970 | 2/1983 | Kunz .......................... 123/557 |
| 4,391,259 | 7/1983 | Urban ......................... 123/557 |
| 4,398,523 | 8/1983 | Henson ....................... 123/557 |
| 4,411,240 | 10/1983 | Kravetz ....................... 123/557 |
| 4,429,675 | 2/1984 | Talbert ........................ 123/557 |
| 4,469,075 | 9/1984 | Jackson et al. ............... 123/557 |
| 4,519,358 | 5/1985 | Redele ........................ 123/557 |

FOREIGN PATENT DOCUMENTS 56-83559   7/1981   Japan ............................ 123/549

*Primary Examiner*—Andrew M. Dolinar
*Attorney, Agent, or Firm*—Kelly, Bauersfeld & Lowry

[57] ABSTRACT

A carburetion system for an internal combustion engine includes a fuel heater and vaporizer unit which produces a 30% liquid/70% vapor fuel mixture for delivery to the carburetor, and a flow control valve connected to be responsive to the ported vacuum pressure in the carburetor to increase the flow of heated and vaporized fuel to the carburetor when the ported pressure decreases, and decrease the flow of such heated and vaporized fuel when the ported pressure increases. The air drawn into the carburetor as a result of engine operation is further heated to a temperature within the range 160° F. to 180° F., by thermister controlled heating elements. In operation, the flow control valve works in conjunction with the carburetor float chamber to provide varying amounts of heated liquid fuel and heated vaporized fuel for mixing within the carburetor with the heated air, to enhance combustion within the engine and produce a corresponding reduction in exhaust pollutants.

32 Claims, 9 Drawing Figures

INTERNAL COMBUSTION ENGINE POLLUTANT CONTROL SYSTEM

RELATED APPLICATION

This is a continuation-in-part of U.S. Pat. application Ser. No. 729,656, filed May 2, 1985, abandoned.

BACKGROUND OF THE INVENTION

This invention relates generally to internal combustion engines, and more specifically, to an improved system for automatically controlling the air/fuel mixture passing to the engine in a manner ensuring proper operation of the engine over a wide spectrum of operating conditions, while simultaneously improving combustion of the volatile mixture and thereby reducing pollutants.

The usual automotive vehicle using a gasoline powered internal combustion engine includes a fuel tank, a fuel pump and a carburetor. The carburetor is provided with a chamber for receiving gasoline from the fuel pump, and a float controlled valve maintains the gasoline at a constant level in the chamber. The usual carburetor includes a venturi through which air for combustion is drawn at substantial velocity, thus producing in the venturi a pressure substantially less than atmospheric. This reduced pressure induces a flow of fuel from the float chamber of the carburetor, and as the gasoline in liquid phase emerges from jets or nozzles within the venturi, it is atomized or vaporized, or both, and mixed with the combustion air flowing through the venturi.

The mixture of air and fuel is delivered to a manifold, and from the manifold is drawn into the engine cylinders during the suction strokes of the pistons therein. The air/fuel mixture is compressed in each cylinder during the compression stroke of the piston, and is then ignited, either by a spark in the conventional engine, or by compression with or without supplementary heating means in a diesel engine. Ideally, combustion of the air/fuel mixture, which is initiated at the spark plug gap, progresses rapidly and is fully complete at the end of the power stroke of the cylinder. Too rapid burning or detonation is wasteful and causes knocking. Too slow burning results in some fuel failing to burn and being discharged in the exhaust. It is recognized that in the usual gasoline engine a very substantial percentage of fuel is wasted, and a relatively small percentage of the total energy available in the fuel is converted into usable energy by the engine.

Due to the inefficiencies of prior engines, many attempts have been made to improve the same by increasing the efficiency of the associated carburetion system. The ultimate purpose in increasing the efficiency of the carburetion system for an engine is to increase the percentage of fuel totally burnt in the cylinders, thereby increasing fuel economy and reducing certain undesirable combustion by-products such as hydrocarbons and carbon monoxide, and increase other more desirable combustion by-products such as carbon dioxide.

It is generally accepted that reduction of harmful emissions could be accomplished by delivering a homogeneous mixture of air and fuel to the engine, thereby allowing lean mixtures to be burned with complete combustion. Known state of the art carburetion-induction devices utilized with the conventional internal combustion engine are capable of providing complete combustion with air/fuel ratios of about 18.5:1. Air to fuel ratios in this range are effective in reducing the undesirable hydrocarbon and carbon monoxide by-products of combustion.

Prior proposed systems for increasing the efficiency of combustion and decreasing the levels of certain undesirable combustion by-products have included apparatus for heating and/or vaporizing fuel prior to injection into the carburetor venturi, devices for preheating air before mixing the same with injected fuel, and various other systems intended to separate the lighter from heavier fuels in a mixture before mixing with air. Although many different systems have been proposed for increasing the efficiency of internal combustion engines and reducing pollutants, none have proved entirely satisfactory over the broad spectrum of engine operating conditions, as those commonly encountered in automobile engines.

In this regard, it has been found that it is not only necessary for a system to be susceptable to tight control of the air/fuel ratio, but the system must also have the flexibility to allow change in the air/fuel ratio which changes with varying load conditions. If the system does not have this flexibility but does have the ability to maintain a constant air/fuel ratio, it would only really be effective over a desired or given operating range and would not function well outside such range.

Accordingly, there has been a need for an improved internal combustion engine pollutant control system which is capable of tightly controlling the air/fuel mixture ratio received into the intake manifold, which system also has the flexibility to allow a change in the air/fuel ratio with changes in engine load conditions and speed. In particular, there is a need for an improved system which is capable of maximizing fuel efficiency in automobile engines, while simultaneously permitting changes in the air/fuel mixture to ensure engine responsiveness to typical driving conditions. Such a system should preferably be adapted for use with existing carburetion systems, be capable of use with such existing carburetion systems while also requiring minimal modification to the same, and be constructed of components known to be able to withstand the rigors of long term automobile engine usage. Additionally, in connection with the foregoing, there is a need for a novel apparatus capable of safely and efficiently heating and partially vaporizing fuel into a specific mixture, and associated apparatus for controlling passage of the heated and partially vaporized fuel mixture to the carburetor. Such systems and apparatus should be of simplified construction, and maximize use of existing engine components. The present invention fulfills these needs and provides other related advantages.

SUMMARY OF THE INVENTION

The present invention resides in an improved internal combustion engine pollutant control system which, in effect, modifies the carburetion of the engine to reduce exhaust pollutants while simultaneously ensuring engine responsiveness to changes in carburetor throttling. To this effect, the improved system entails the heating of air drawn into the carburetor to a temperature within the range of 160° F. to 180° F. Further, the fuel is heated and vaporized prior to mixing with the heated air into a mixture of approximately 30% liquid fuel and approximately 70% vaporized fuel by volume at a temperature within the range of 115° F. to 125° F.

During an engine idle condition when the throttle is closed, only heated liquid fuel is injected into the carburetor to ensure smooth operation. As the throttle is opened, however, additional quantities of heated liquid fuel are momentarily injected into the carburetor, followed by injection of heated vaporized fuel. As the engine speed is further increased, a combination of heated liquid fuel and heated vaporized fuel is injected into the carburetor for mixing with the heated air to form an appropriate explosive mixture needed for sustained and responsive engine operation. Finally, the system further provides that as the throttle is closed, the amount of heated vaporized fuel injected into the carburetor is decreased and eventually shut off, so that as the engine again comes into an idle condition only heated liquid fuel is injected into the carburetor.

In a preferred form of the invention, a standard carburetor is utilized since the other components of the system can be added to the standard carburetor to improve virtually any existing internal combustion engine. For reference purposes, standard carburetors typically have a venturi mixing throat in fluid communication with an air intake at one end, and the intake manifold at the other end. Such standard carburetors typically further include a fuel float chamber, and a plurality of passage from the fuel chamber to the carburetor mixing throat.

In connection with this standard carburetor, the preferred system includes at least one electrical resistance heating element situated within the air intake for heating the air supplied to the carburetor venturi mixing throat to a temperature within the range of 165° F. to 175° F. The temperature of the resistance heating element is controlled by an air temperature sensing thermister situated downstream of the resistance heating element, which functions as an on/off switch to control voltage input to the air heating element.

Situated generally adjacent this air heating element is a free-wheeling fan which functions to increase the turbulence of the heated air drawn into the carburetor mixing throat. It has been found that by increasing the turbulence of such air, the mixing of the air and fuel within the venturi mixing throat is enhanced to improve combustion of the volatile mixture within the engine.

A fuel heating and vaporizing means is interposed between the fuel pump and the carburetor to transform the fuel into a mixture of approximately 30% heated liquid fuel and approxiamately 70% heated vaporized fuel by volume. This heating and vaporizing means includes an electrical resistance heating element and a heat sink which defines a labyrinth having an inlet and an outlet. Fuel temperature sensing means and a thermister are further provided to regulate the temperature of the heat sink to ensure that the temperature of the fuel mixture at the outlet of the labyrinth is within the range of 115° F. to 125° F. A flow constricting valve is further provided in the proximity of the labyrinth inlet to help vaporize and increase turbulence of the fuel as it enters the labyrinth.

Finally, the apparatus of the presently preferred embodiment includes means for controlling the flow of the mixture of liquid and vaporized fuel from the labyrinth outlet to the float chamber. More specifically, this controlling means includes a flow control valve having a valve inlet in communication with the labyrinth outlet, a valve outlet in communication with the carburetor float chamber, a valve passageway connecting the valve inlet to the valve outlet, a valve member situated and dimensioned to control the flow of fuel through the valve passageway, and means for moving the valve member with respect to the valve passageway.

The valve moving means includes a valve shaft connected at one end to the valve member, and a flexible diaphragm connected to the other end of the valve shaft, which diaphragm is exposed on one side to atmospheric pressure and on the other side to ported vacuum pressure. A spring is positioned above the diaphragm to bias the same in a downward direction to urge the valve member to normally restrict flow through the valve passageway. The tension force on the spring can be adjusted to meet the particular criteria needed to fine tune the apparatus for particular carburetion requirements. Additionally, a rib is provided on the valve passageway surface to prevent complete closure by the valve member. This particular arrangement effectively permits the flow control valve to restrict the flow of fuel between the fuel heating and vaporizing means and the carburetor, while not altogether preventing any flow therethrough.

The aforementioned apparatus, and particularly the flow control valve, permits the carburator float chamber to remain substantially full of liquid fuel during an engine idle condition, and the liquid fuel escaping therefrom as the engine idles is constantly replenished with fuel already subject to conditioning by the labyrinth. As engine speed is increased, the flow control valve opens to allow a greater amount of fuel to pass from the labyrinth into the float chamber. Because of the fuel demand exerted by increased engine operation, the liquid fuel level will tend to drop within the float chamber sufficiently to permit vaporized fuel to pass through the float chamber directly into the venturi mixing throat for mixing with heated air drawn through the air intake.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
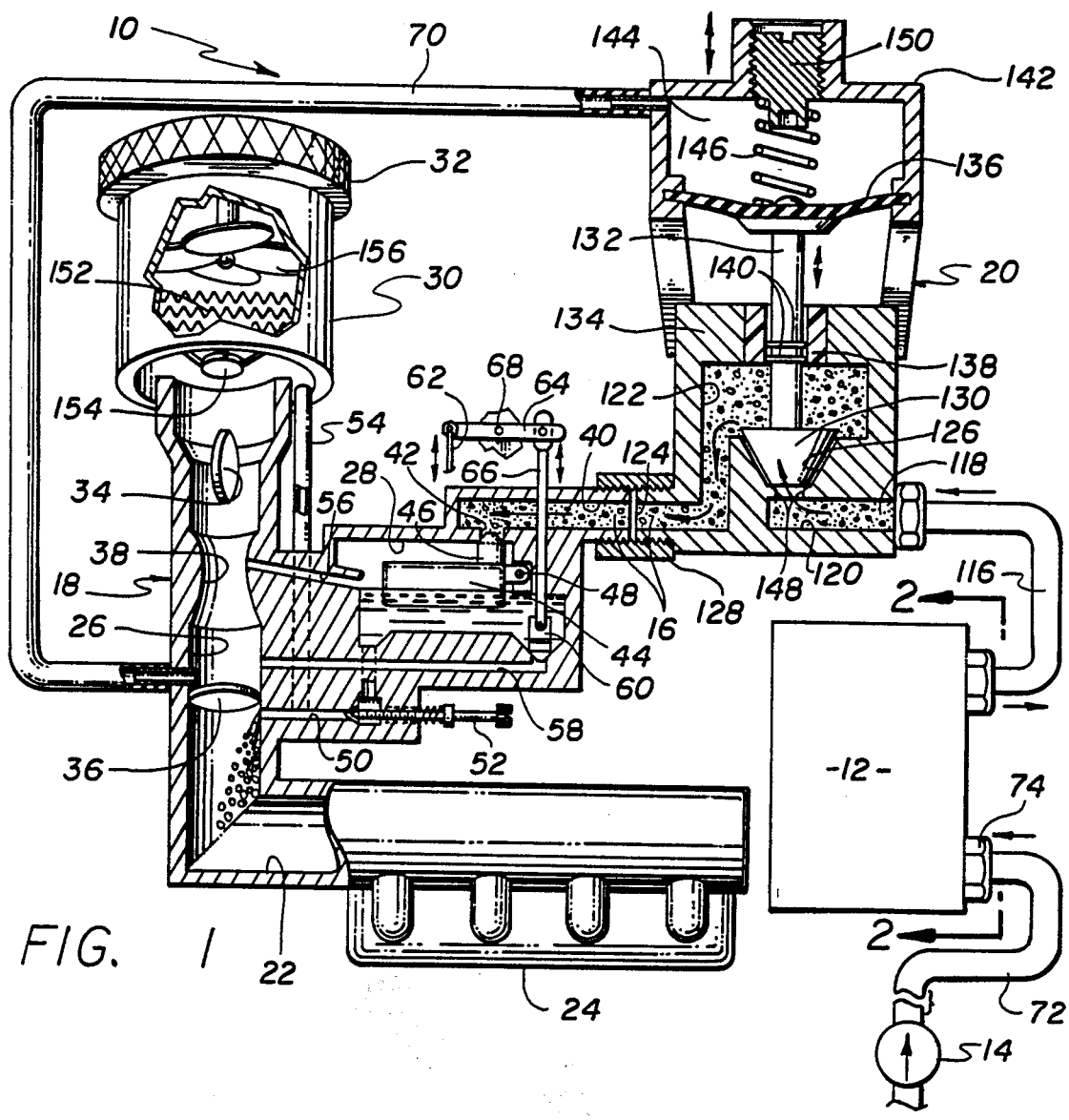
FIG. 1 is a diagrammatic illustration of a carburetion system for an internal combustion engine incorporating the improved features of the present invention, the configuration of the specific components being illustrated as they would appear during an engine idle condition.

As shown in the drawings for purposes of illustration, the present invention is concerned with an improved internal combustion engine pollutant control system, generally designated by the reference number 10. This improved pollutant control system 10 broadly comprises a fuel heating and vaporizing unit 12 situated to receive liquid fuel from a fuel pump 14 and produce a predetermined mixture 16 of liquid and vaporized fuel for delivering to a carburetor 18. Controlling delivery of the fuel mixture 16 from the heating and vaporizing unit 12 to the carburetor 18 is a flow control valve 20.

The improved pollutant control system 10 of this invention is capable of tightly controlling the air/fuel mixture ratio produced at the carburetor 18 for delivery to an intake manifold 22, which ultimately directs the air/fuel mixture to combustion chamber means 24. The improved system 10 also has the flexibility to allow changes in the air/fuel mixture ratio corresponding to changes in engine load conditions and speed. This is particularly important if use of the improved system 10 is to be feasible in automobile engines, where the fuel demands of the carburetion system vary widely from idle engine conditions to wide open operation engine conditions.

To better understand the technological advance accomplished by the present invention, the components routinely associated with an internal combustion engine will hereafter be described. The standard carburetor (schematically illustrated in FIGS. 1, 3 and 4) includes generally a mixing throat 26 and a fuel float chamber 28 which stores a measured quantity of fuel for delivery to the mixing throat as will be hereinafter described. The upper end of the carburetor 18 is attached to an air intake apparatus 30 which includes an air filter 32 for removing particulate matter from the air drawn into the carburetor mixing throat 26. The lower end of the carburetor 18 is connected to the intake manifold 22 to direct the air/fuel mixture received from the mixing throat 26 to the combustion chamber means 24.

Situated within the air flow passageway between the air intake apparatus 30 and the mixing throat 26 is a choke valve 34 utilized primarily to enrich the air/fuel mixture for cold engine starting conditions. A similar throttle valve 36 is disposed generally between the mixing throat 26 and the intake manifold 22 to control the various vacuum pressures created within the carburetor 18 as a result of air and fuel being drawn into the combustion chamber means 24. For purposes of understanding terminology to be hereinafter used, the manifold vacuum is the negative pressure generated between the throttle valve 36 and the combustion chamber means 24, the ported vacuum is the negative pressure generated between a carburetor venturi 38 and the throttle valve, and the venturi vacuum is the negative pressure generated between the choke valve 34 and the carburetor venturi.

Fuel is pumped into the float chamber 28 from the fuel pump 14 through a carburator fuel inlet 40 and a float chamber valve passageway 42. A fuel float member 44 having an upwardly projecting valve stem 46 is connected at a hinge 48 within the float chamber 28 in a manner such that the float chamber passageway 42 will be opened to fuel flow therethrough unless there is sufficient liquid fuel within the float chamber to raise the float 44 into a position causing the valve stem 46 to occlude the float chamber valve passageway 42. Such occlusion of the float chamber valve passageway 42 is illustrated in FIG. 1.

A plurality of fluid flow passageways are provided between the fuel float chamber 28 and the mixing throat 26 to permit fuel within the float chamber to be mixed with air and form a volatile mixture for delivery to the combustion chamber means 24. A first such fuel passageway 50 forms an idle circuit which permits fuel to flow from the float chamber 28 to a portion of the carburetor 18 immediately below the throttle valve 36. The flow of fuel through this idle circuit 50 is controlled by an adjustable needle valve 52, and fuel flowing past the needle valve is mixed with air supplied from the air intake apparatus 30 through an idle air bleed line 54. A second one 56 of the aforementioned passages between the fuel float chamber 28 and the mixing throat 26 comprises a primary discharge tube having an inlet slightly elevated above the inlet of the fuel idle circuit 50, and an outlet which discharges fuel at the carburetor venturi 38. Finally, a third such passage 58 typically found in automotive carburetors comprises a power enrichment circuit which, when opened to fuel flow, directs additional amounts of fuel into the mixing throat 26 between the venturi 38 and the throttle valve 36.

Figure 3:
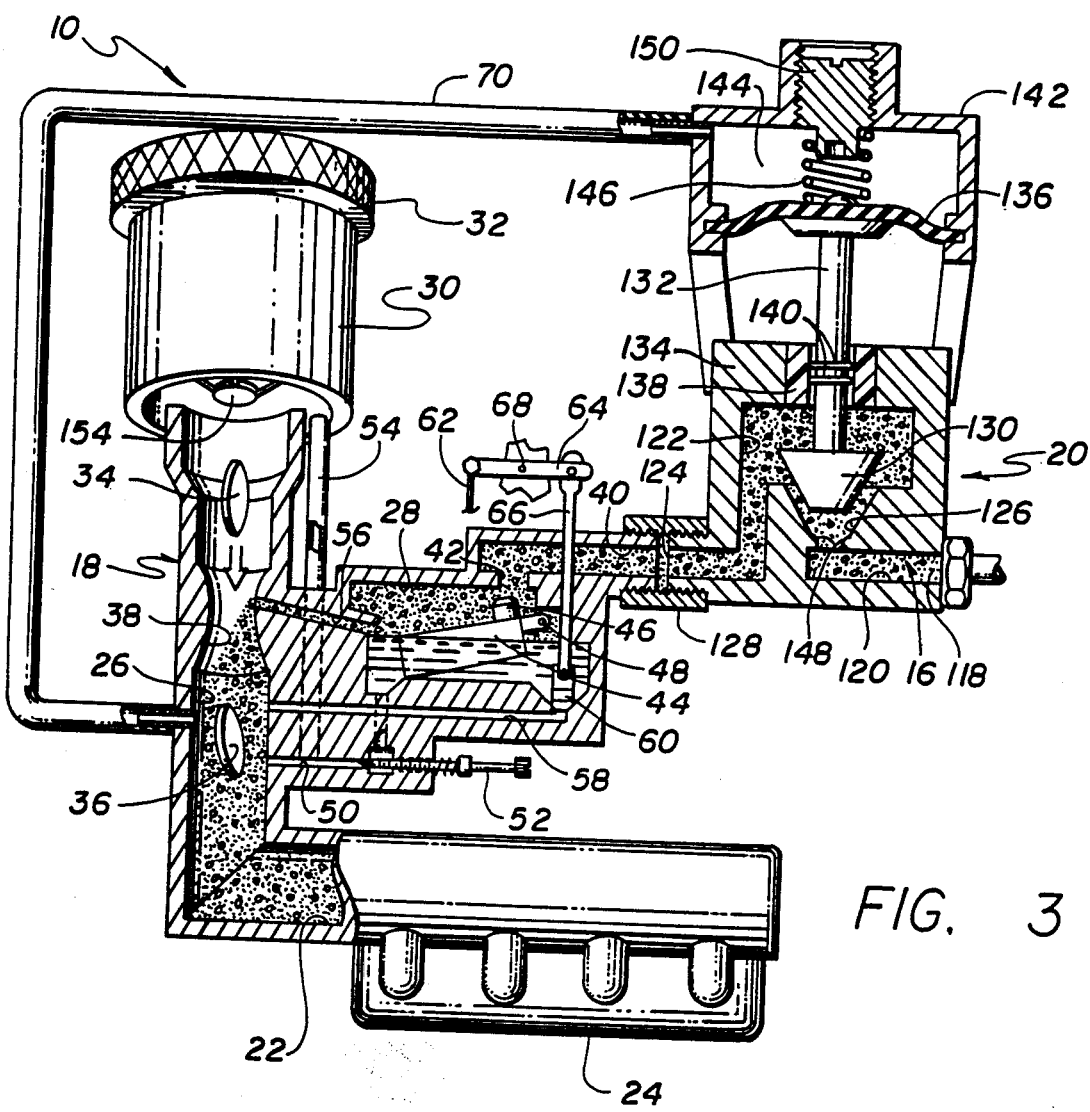
FIG. 3 is a diagrammatic view similar to that illustrated in FIG. 1, illustrating the configuration of the particular system components as they would appear during an engine cruise condition.

During an engine idle condition, the throttle valve 36 is completely closed, thereby preventing the creation of sufficient ported vacuum pressure to draw fuel through the primary discharge tube 56 into the mixing throat 26. Sufficient manifold vacuum exists, however, in combination with the atmospheric pressure in the float chamber 28, to cause fuel to flow through the idle circuit 50 into the carburetor 18. The mixture of air from the bleed line 54 and fuel from the idle circuit 50 may be adjusted by means of the needle valve 52 to provide a sufficient air/fuel mixture to keep the engine running at idle (FIG. 1). As the throttle valve 36 is opened, the ported vacuum pressure decreases sufficiently to draw fuel through the primary discharge tube 56, and thereby supply sufficient amounts of fuel to the engine for smooth operation thereof (FIG. 3). The power enrichment circuit 58 is utilized when even additional amounts of fuel are required during acceleration and wide open engine operation.

In this regarding, a mechanical linkage is provided to open a valve 60 situated to normally close the inlet to the power enrichment circuit. This mechanical linkage includes a member 62 typically connected to the accelerater cable (not shown), a yoke 64 connected to the member 62 at one end and to a linkage shaft 66 at the other, which linkage shaft is connected opposite the yoke to the valve 60. As the throttle valve 36 is rotated to an open position (see FIG. 4), movement of the member 62 causes the yoke 64 to pivot about a hinge point 68, and draw the linkage shaft 66 upwardly and thereby remove the valve 60 from the inlet of the power enrichment circuit 58. This permits additional amounts of liquid fuel to travel through the power enrichment circuit 58 into the mixing throat 26 to enrich the air/fuel mixture being delivered to the intake manifold 22.

In accordance with the present invention and as mentioned briefly above, the fuel heating and vaporizing unit 12 and the flow control valve 20 are disposed in the fuel flow path between the fuel pump 14 and the carburetor float chamber 28. The flow control valve 20 is connected to the ported vacuum pressure within the carburetor mixing throat 26 by means of a ported vacuum line 70, and is responsive to that pressure to increase the flow of the fuel mixture 16 when the ported vacuum pressure decreases, and decrease the flow of the fuel mixture 16 when the ported vacuum pressure increases. As will be more fully explained below, the provision of the heating and vaporizing unit 12 and the flow control valve 20 between the carburetor 18 and the fuel pump 14 modifies carburetion of the associated internal combustion engine so that during an engine idle condition, the float chamber 28 remains substantially full of liquid fuel, and such liquid fuel escaping from the float chamber 28 through the idle circuit 50 to the mixing throat 26 is replenished with fuel already heated by the heating and vaporizing unit. As engine speed is increased, the flow control valve 20 causes the liquid fuel level to drop within the float chamber 28 sufficiently to permit vaporized fuel to pass into the mixing throat 26 for mixing with heated air drawn through the air intake apparatus 30.

Figure 2:
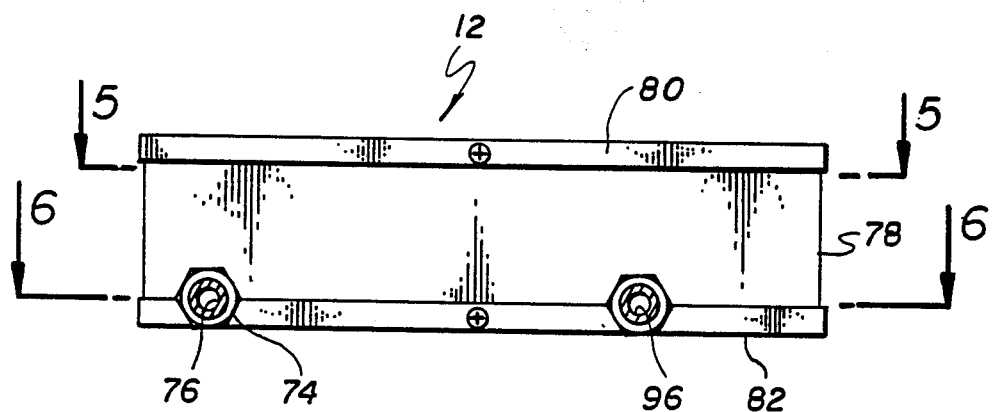
FIG. 2 is an enlarged, partially sectional, elevational view of a fuel heating and vaporizing unit forming a portion of the present invention, taken generally along the line 2—2 of FIG. 1.
Figure 5:
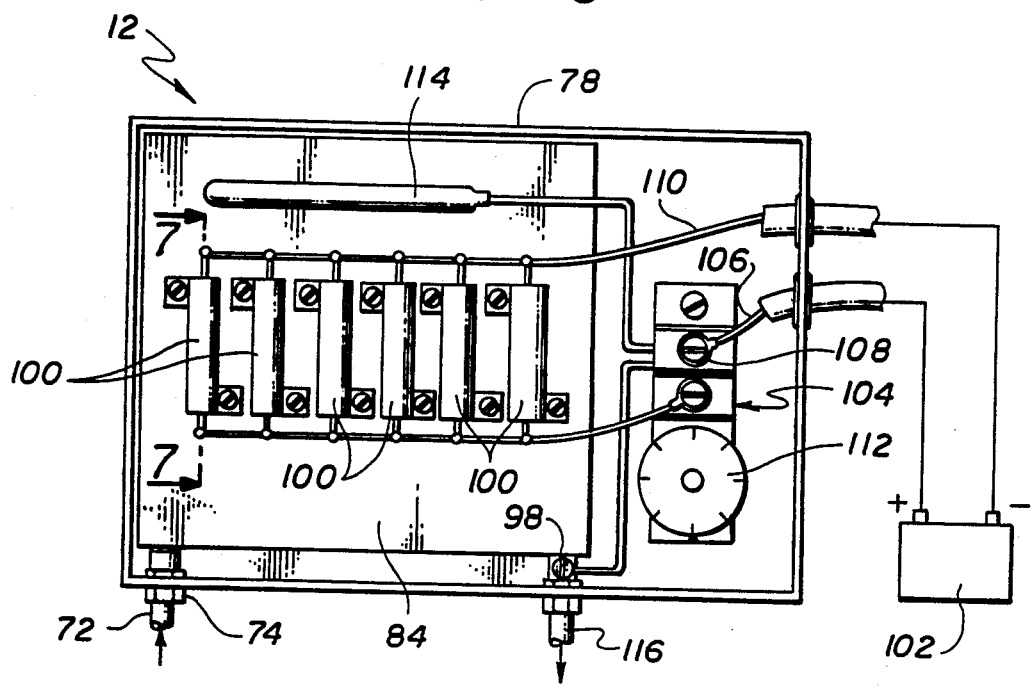
FIG. 5 is a partially diagrammatic plan view of the fuel heating and vaporizing unit, taken generally along the line 5—5 of FIG. 2.
Figure 6:
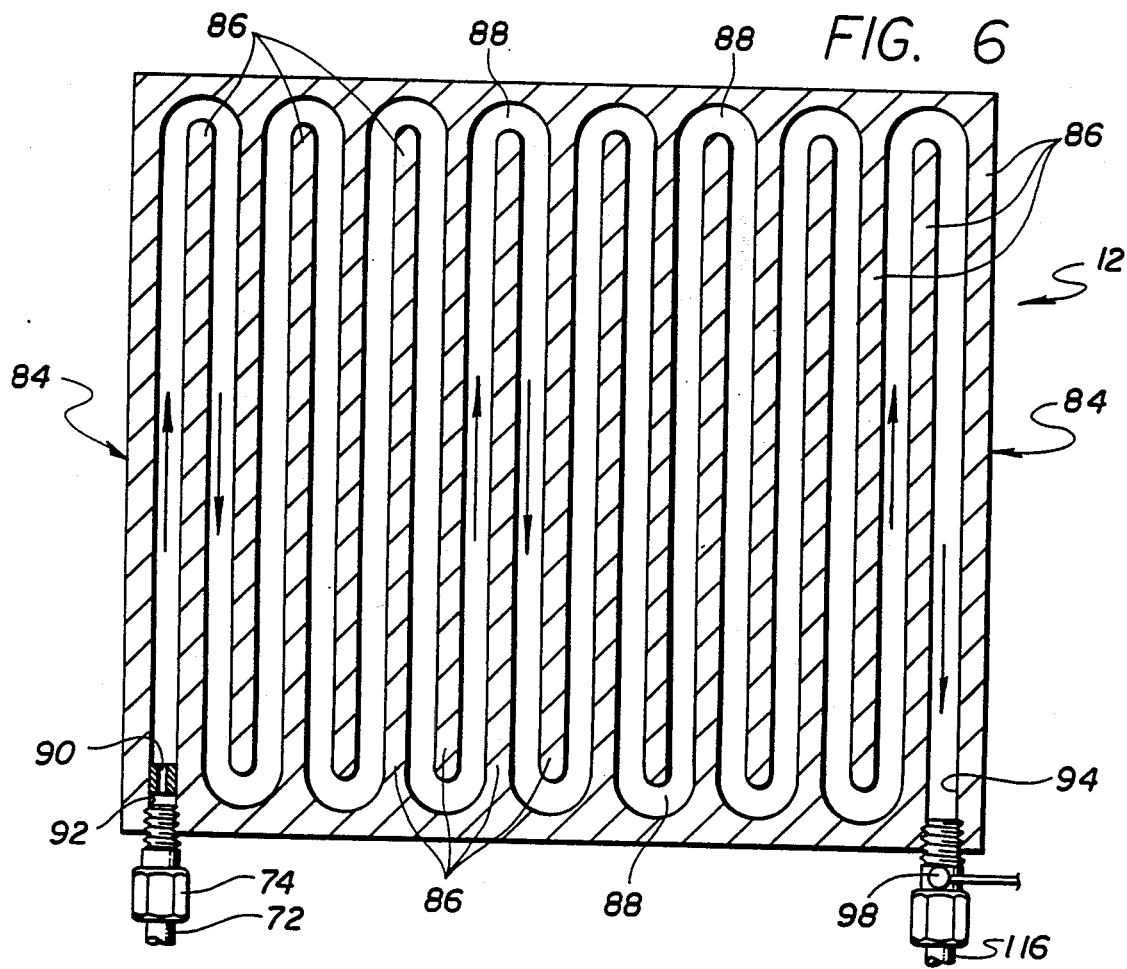
FIG. 6 is an enlarged sectional view of the fuel heating and vaporizing unit, taken generally along the line 6—6 of FIG. 2.

Now describing the fuel heating and vaporizing unit 12 in more detail, and in conjunction with the detailed illustrations of the same in FIGS. 2 and 5-7, liquid fuel from the fuel pump 14 typically travels through a fuel line 72 connected by a suitable connector 74 to a heating and vaporizing unit inlet 76. The entire fuel heating and vaporizing unit 12 is housed within a box-like container 78 having a removable upper cover 80 and a similar removable lower cover 82 (FIG. 2). Liquid fuel entering the unit inlet 76 enters into a heat sink 84 which comprises a plurality of interleaved walls 86 forming a fuel flow labyrinth passageway 88. A flow constricting valve or orifice 90 is situated within an inlet 92 of the labyrinth 88 to help vaporize the liquid fuel as it is being heated during its passage through the labyrinth. A labyrinth outlet 94 is in fluid communication with a fuel heating and vaporizing unit outlet 96, whereat a temperature sensor 98 is preferably located to measure the temperature of the heated liquid and vaporized fuel mixture 16 exiting the unit 12 (FIG. 6).

Situated atop the heat sink 84 are a plurality of electrical resistance heating elements 100 which are electrically connected in parallel to one another to a battery 102 through an adjustable thermister 104. More particularly, a positive electrical lead 106 from the battery 102 passes through the container 78 for connection to the thermister 104 at a lead terminal 108. If the temperature of the fuel exiting the labyrinth 88 is not within a predetermined temperature range, the thermister 104 will permit passage of the voltage from the battery 102 to the heating elements 100 for purposes of heating the heat sink 84. To complete the electrical connection, each of the heating elements 100 is further connected to a ground 110 which, as with the lead 106, also passes through the container 78 back to the negative terminal of the battery 102. The thermister 104 includes a temperature setting knob 112 which permits precise temperature control over the fuel mixture 16 exiting the unit outlet 96. To further prevent the fuel from becoming heated above the desirable range, a standard thermocouple 114 is placed adjacent the upper surface of the heat sink 84 as a backup to the temperature sensor 98 (FIG. 5).

It is preferred that the fuel mixture 16 exiting the fuel heating and vaporizing unit 12 consist of approximately 30% liquid fuel and approximately 70% vaporized fuel by volume. Further, it is preferred that the temperature of this fuel mixture 16 be within the range of 115° F. to 125° F.

The heated and partially vaporized fuel mixture 16 enters a secondary fuel line 116 as it exits the heating and vaporizing unit 12, which secondary line directs that fuel mixture to an inlet 118 of the flow control valve 20. The flow control valve 20 includes an inlet chamber 120 in open fluid communication with the inlet 118, an outlet chamber 122 in open fluid communication with a flow control valve outlet 124, and a valve passageway 126 connecting the inlet chamber to the outlet chamber. The flow control valve outlet 124 is shown connected to the carburetor fuel inlett 40 by means of a threaded coupling 128, so that when needed, fuel may pass directly from the fuel heating and vaporizing unit 12 to the carburetor 18.

A valve head 130 is connected to the lower end of a valve shaft 132 and is positioned in axial alignment over the valve passageway 126 to, in some circumstances, restrict the flow of fluid therethrough. This shaft 132 passes through an upper wall 134 of the outlet chamber 122 and is connected at its upper end to a flexible diaphragm 136. The upper wall 134 is provided with a Teflon sleeve 138 which is designed to interact with a pair of O-rings 140 situated about the shaft 132, to form a seal therebetween and prevent the escape of any of the fuel mixture 16 from the flow control valve 20 other than through the outlet 124.

The flexible diaphragm 136 is housed within and extends across an upper housing 142 of the flow control valve 20. This upper housing 142 is constructed so that the lower surface of the diaphragm 136 is exposed to atmospheric pressure, while the upper surface of the diaphragm is exposed solely to ported vacuum pressure. This is accomplished by enclosing the upper surface of the diaphragm 126 within a vacuum chamber 144 which is in open communication with the ported vacuum of the carburetor 18 through the ported vacuum line 70. A spring 146 is further provided within the chamber 144 between an upper portion of the upper housing 142 and the upper surface of the diaphragm 146, to urge the diaphragm, and consequently the shaft 132 downwardly so that when the engine is not running, the valve head 130 will rest upon a pair of ribs 148 protruding from the valve passageway 126. The purpose of providing these ribs 148 is to prevent the complete closure of the valve passageway 126 to flow therethrough, so that the flow control valve 20 simply controls the amount of the fuel mixture 16 flowing through the valve, rather than whether any flow is allowed through the valve at all. Presently, the ribs 148 preferably create a 0.015 inch minimum gap between the valve passageway 126 and the valve head 130 when in a fully restricted position. Finally, an adjustable screw cap 150 is provided through the upper portion of the upper housing 142, to permit adjustment of the tension of the spring 146 upon the diaphragm 136.

In addition to the foregoing, the preferred embodiment of the present invention further includes means for heating the air drawn through the air intake apparatus 30 before entering the carburetor mixing throat 26. This air heating means includes a resistance heating element 152 situated within the air intake apparatus 30, and a thermister 154 situated downstream of the heating element 152 to ensure that the air drawn through the air intake apparatus 30 into the mixing throat 26 is heated to a temperature within the range 160° F. to 180° F. Moreover, a free-wheeling fan 156 is situated within the air intake apparatus 30 below the air filter 32 but above the heating element 152, to increase the turbulence of the heated air drawn into the carburetor mixing throat 26. The purpose of increasing the turbulence of the heated air is to improve mixing of the air and the fuel within the carburetor to improve combustion of the resultant air/fuel mixture within the combustion chamber means 24.

Having thus described the apparatus of the present invention, carburetion of an internal combustion engine utilizing the improved system 10 will now be explained. Referring generally to FIG. 1, prior to starting the engine the fuel float chamber 28 will typically be full of fuel, the throttle valve 36 will be closed, and the valve head 130 will be positioned to maximize restriction of fuel flow through the flow control valve 20. Upon starting the engine and during an engine idle condition, liquid fuel will be drawn through the idle circuit 50 into the carburetor 18 below the throttle valve 36 to provide the necessary explosive mixture to maintain the engine in that condition. The air heating element 152 and the heat sink heating elements 100 are preferably connected to the voltage source (battery 102) so that activation of the ignition system will simultaneously activate those heating elements. As fuel is drawn through the idle circuit 50, the float 44 will slightly drop, thus moving the valve stem 46 away from the float chamber valve passageway 42, and allow additional fuel to enter the float chamber 28. Gradually, the fuel entering the float chamber 28 will be heated by the fuel heating and vaporizing unit 12 until it reaches a consistency of approximately 30% liquid fuel and 70% vaporized fuel by volume within the temperature range of 115° F. to 125° F. Thus, as the engine warms up, the overall thermo efficiency of the engine will be improved through the provision of heated fuel, resulting in decreased undesirable combustion by-products in the form of pollutants.

As the throttle valve 36 is opened to increse engine speed, air is drawn directly through the air intake apparatus 30, past the air heating element 152 into the carburetor mixing throat 26. This fast moving air causes the pressure to lower sufficiently at the carburetor venturi 38 to begin to draw liquid fuel from the float chamber 28 through the primary discharge tube 56. The ported vacuum pressure will simultaneously decrease, thus acting to raise the valve head 130 away from the valve passageway 126 against the downward biasing of the spring 146. The effect of heating and vaporizing the fuel at the fuel heating and vaporizing unit 12, and allowing increasing amounts of the heated fuel mixture 16 to pass through the flow control valve 20, allows the action of the flow control valve to override the normal function of the fuel float chamber 28, thereby permitting the liquid fuel level within the float chamber to drop sufficiently to permit heated vaporized fuel to pass directly from the float chamber through the primary discharge tube 56 into the carburetor mixing throat 26.

Figure 8:
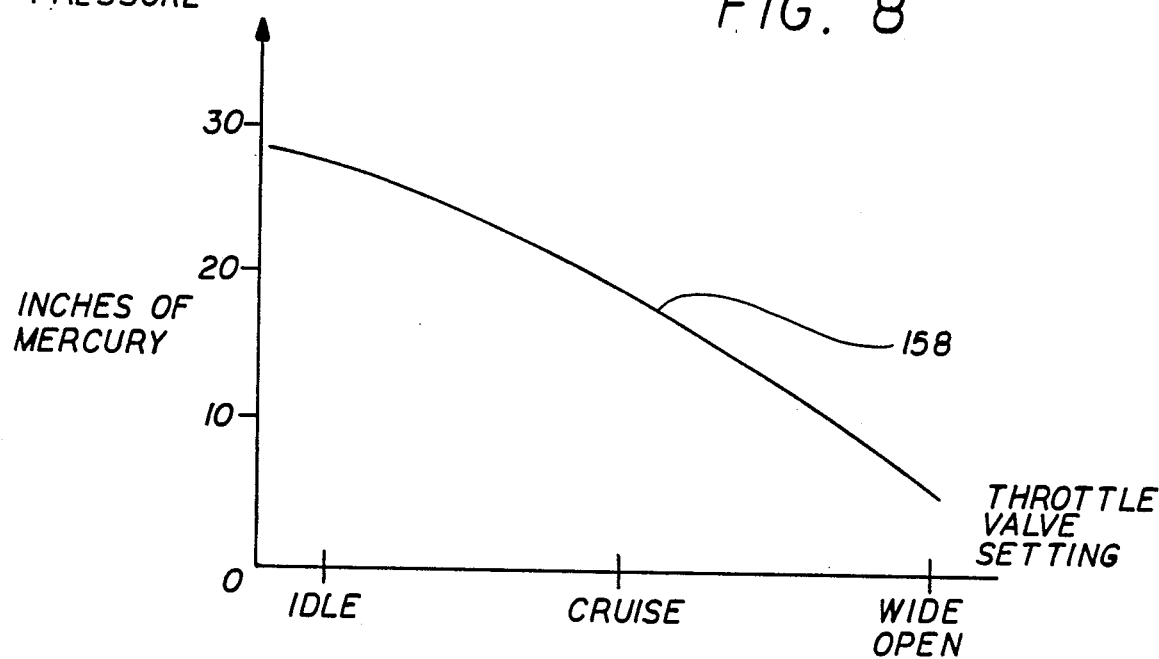
FIG. 8 is a plot of ported vacuum pressure versus throttle valve setting.

In this regard, FIG. 8 shows a plot 158 of the ported vacuum pressure in the carburetor 18 given in inches of mercury, versus the throttle valve setting. It will be noted that the ported vacuum pressure is almost atmospheric during idle conditions. This pressure drops to about eighteen or nineteen during a cruise engine operating condition, and when the carburetor is wide open, the ported vacuum pressure may be on the order of seven or eight inches of mercury. This pressure defined by the plot 158 is utilized to control actuation of the flow control valve 20 to activate the diaphragm 136.

As the throttle valve 36 is further opened and the engine is taken through acceleration to a wide open operating condition (as illustrated best in FIG. 4), even greater quantities of fuel are needed to ensure smooth operation of the engine. In this regard, the linkage mechanism described above in connection with the power enrichment circuit 58 opens to permit heated liquid fuel to pass through the power enrichment circuit directly into the mixing throat 26 of the carburetor 18. This heated liquid fuel, together with the heated vaporized fuel discharging from the float chamber 28 through the primary discharge tube 56, combines with the heated air from the air intake apparatus 30 to provide a much more readily combusted air/fuel mixture for delivery to the combustion chamber means 24.

Thus, from the foregoing it is to be understood that the improved system 10 of the present invention can be readily added to existing internal combustion engine carburation systems to improve the combustability of the air/fuel mixture being drawn into the combustion chamber means 24, and thereby advantageously improve fuel efficiency while simultaneously reducing the level of undesirable combustion by-products.

Figure 9:
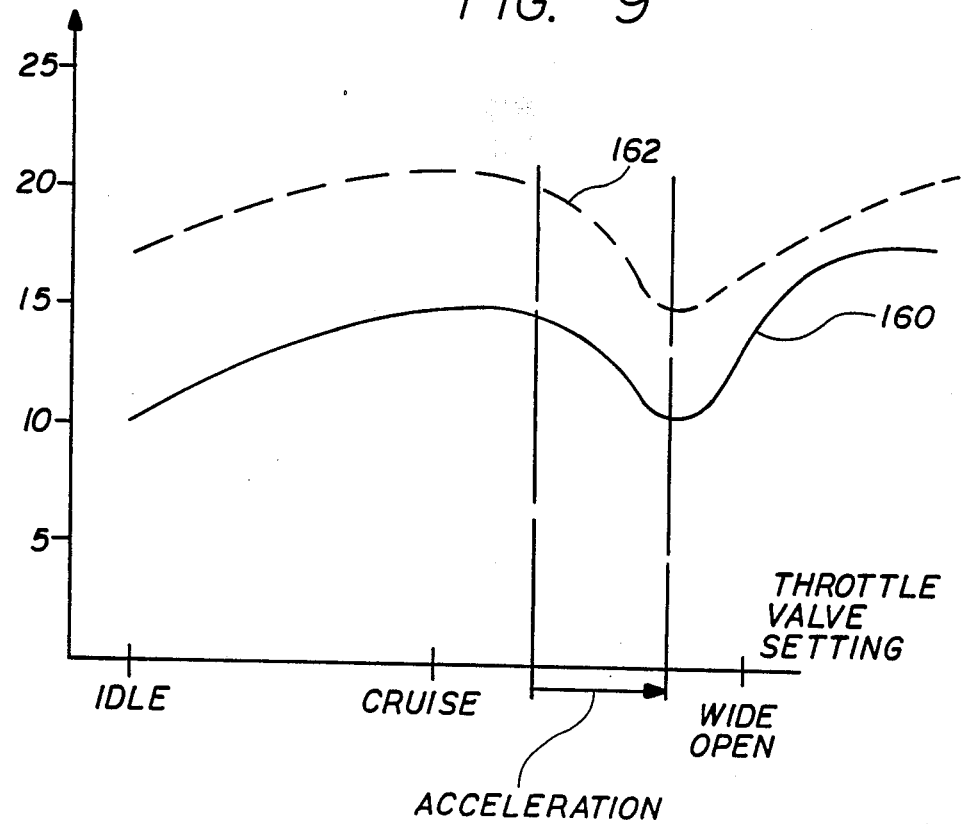
FIG. 9 illustrates the plots of the air/fuel ratio of a standard carburetor with and without the addition of the present invention, over the operating range of an engine between idle and wide open.

Referring to FIG. 9, there is shown a plot 160 of the air/fuel ratio as a function of engine operation between idle and wide open. This plot 160 shows conditions in the absence of the improved system 10 between the fuel pump 14 and the carburetor 18. It can be seen that at idle the air/fuel ratio is about 10:1, and rises to about 15:1 at cruise. After acceleration the air/fuel ratio may approach 16:1.

Considering now the operation of the engine carburetion system when the improved system 10 is functioning in response to the ported vacuum pressure illustrated in FIG. 8, it will be seen that at idle the air/fuel ratio is above 15:1, and at cruise can increase to about 20:1. After acceleration, this air/fuel ratio may increase to about 21:1, and because of the relatively lean mixture, improved combustion takes place. It will be evident from the curve 162 that this air/fuel ratio throughout the range of engine operation is consistently higher from idle to wide open than in the absence of the described improved system 10. These improvements are possible without extensive modifications to existing carburetors, and further without diminishing engine performance and responsiveness.

As the throttle valve 36 is moved from a wide open configuration back to the idle condition, first the power enrichment circuit 58 will close, and then eventually the heated vaporized portion of the fuel mixture 16 will cease to pass through the primary discharge tube 56 into the mixing throat 26. Further, since the ported vacuum pressure will increase as the engine is returned to an idle condition, the spring 146 will again urge the diaphragm 136 downwardly to restrict the flow of fuel through the valve passageway 126. Since some of the fuel mixture 16 must be allowed through the valve passageway 126 when there is insufficient ported vacuum pressure to overcome the biasing force of the spring 146, the ribs 148 are provided on the surface of the valve passageway 126 to prevent the total occlusion of the same.

Figure 4:
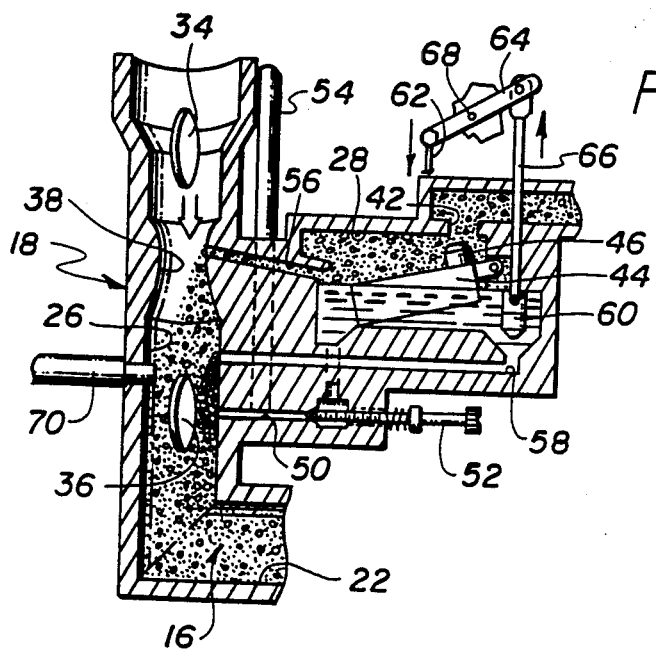
FIG. 4 is a diagrammatic view similar to FIGS. 1 and 3, illustrating the configuration of various elements of the carburetor as they would appear during engine acceleration and wide open operating conditions.
Figure 7:
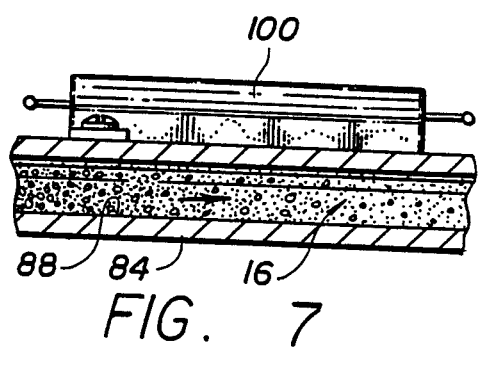
FIG. 7 is an enlarged sectional view of an electrical resistance heater positioned to heat a portion of a heat sink within the fuel heating and vaporizing unit, taken generally along the line 7—7 of FIG. 5.

More specifically, if after thoroughly warming up the engine and running it through cruise to wide open conditions for some time, the engine is suddenly shut off, the liquid fuel level within the float chamber 28 will be low as illustrated in FIGS. 3 and 4. By ensuring that a gap remains between the valve head 130 and the valve passageway 126, condensation of the heated vaporized portion of the fuel mixture 16 will eventually fill the fuel float chamber 28 with liquid fuel to the level illustrated in FIG. 1. This is desirable as previously discussed to provide sufficient quantities of liquid fuel within the carburetor for cold start and idle fuel requirements.

Tests have been conducted to measure engine pollutants at varying engine operating conditions before and after installation of the improved system 10. Sample results of these tests are as follows:

| Before Modification | After Modification |
|---|---|
| Test 1: 1977 Plymouth Fury | |
| 1 at 839 RPM (idle): | 1 at 874 RPM (idle): |
| CO 5.33% | CO 1.58% |
| CO2 8.2% | CO2 9.2% |
| HC 92 PPM | HC 11 PPM |
| 2 at 2495 RPM (cruise): | 2 at 2651 RPM (cruise): |
| CO 3.40% | CO .54% |
| CO2 10.1% | CO2 13.0% |
| HC 55 PPM | HC 1 PPM |
| Test 2: 1969 Oldsmobile Delta 98 | |
| 1 at 728 RPM (idle): | 1 at 686 RPM (idle): |
| CO 3.58% | CO 1.14% |
| CO2 8.9% | CO2 9.8% |
| HC 112 PPM | HC 53 PPM |
| 2 at 2400 RPM (cruise): | 2 at 2536 RPM (cruise): |
| CO 3.10% | CO 0.33% |
| CO2 13.3% | CO2 15.2% |
| HC 57 PPM | HC 64 PPM |
| Test 3: Honda | |
| 1 at 1008 RPM (idle): | 1 at 1044 RPM (idle): |
| CO 0.37% | CO 0.19% |
| CO2 14.3% | CO2 9.1% |
| HC 167 PPM | HC 106 PPM |
| 2 at 2082 RPM (cruise): | 2 at 2500 RPM (cruise): |
| CO 0.74% | CO 0.79% |
| CO2 14.6% | CO2 14.7% |
| HC 121 PPM | HC 94 PPM |
| Test 4: 1976 Dodge Van | |
| 1 at 844 RPM (idle): | 1 at 882 RPM (idle): |
| CO 1.3% | CO 0.43% |
| CO2 11.54% | CO2 10.76% |
| HC 94 PPM | HC 6 PPM |
| 2 at 2502 RPM (cruise): | 2 at 2574 RPM (cruise): |
| CO 0.46% | CO 0.37% |
| CO2 10.79% | CO2 10.59% |
| HC 4 PPM | HC 3 PPM |

Accordingly, from the foregoing, it is clear the the improved system 10 of the present invention is adapted for use with existing carburetion systems with minimal modification to such existing carburetion systems. Further, the improved system can be constructed of components known to be able to withstand the rigors of long term engine usage, and the particular apparatus illustrated and described is capable of safely and efficiently heating and partially vaporizing fuel into a specific mixture, and controlling passage of that mixture into the carburetor 18 for mixing with heated air.

Although a particular embodiment of this invention has been described in detail for purposes of illustration, various modifications may be made without departing from spirit and scope of the invention. Accordingly, the invention is not to be limited, except as by the appended claims.

I claim:

1. A pollutant control system for an internal combustion engine including, among other things, a fuel pump, an air intake means, and an intake manifold for passing an air/fuel mixture to a combustion chamber means, the pollutant control system comprising, in combination:

a carburetor having a venturi mixing throat in fluid communication with the air intake means at one end and the intake manifold at the other end, a fuel float chamber, an first fuel passageway from the float chamber to the mixing throat, and a second fuel passageway between the float chamber and the mixing throat:

means for heating air drawn through the air intake means before entering the carburetor mixing throat, the heating means heating the air to a temperature within the range 160° F. to 180° F.;

means for heating and vaporizing fuel received from the fuel pump prior to entering the float chamber into a mixture of approximately 30% liquid fuel and approximately 70% vaporized fuel by volume at an outlet end of the heating and vaporizing means, the temperature of the fuel mixture at the outlet of the heating and vaporizing means being within the range of 115° F. to 125° F.; and means for controlling the flow of the mixture of liquid and vaporized fuel from the heating and vaporizing means being connected to ported vacuum pressure in the carburetor and responsive to that pressure to increase the flow of the mixture of liquid and vaporized fuel when the pressure decreases, and decrease the flow of the mixture of liquid and vaporized fuel when the pressure increases, whereby during an engine idle condition the float chamber will remain substantially full of liquid fuel and the liquid fuel escaping therefrom through the first fuel passageway is replenished with fuel heated by the heating and vaporizing means, and as the engine speed is increased the flow controlling means will cause the liquid fuel level to drop within the float chamber sufficiently to permit vaporized fuel to pass through the second fuel passageway into the mixing throat for mixing with heated air drawn through the air intake means.

2. A system as set forth in claim 1, wherein the air heating means includes at least one resistance heating element situated within the air intake means, the temperature of the resistance heating element being controlled by an air temperature sensing means situated downstream of the resistance heating element.

3. A system as set forth in claim 1 including a free-wheeling fan situated within the air intake means to increase the turbulence of the heated air drawn into the carburetor mixing throat, whereby mixing of the air and fuel is enhanced to improve combustion within the engine.

4. A system as set forth in claim 1, wherein the fuel heating and vaporizing means includes an electrical resistance heating element and a heat sink, the heat sink defining a labyrinth having an inlet and an outlet, fuel from the fuel pump passing into the inlet, and thence after heat exchange with the heat sink passing out of the outlet to the controlling means.

5. A system as set forth in claim 4, wherein the fuel heating and vaporizing means includes fuel temperature sensing means which, in connection with a thermister controlling electrical input to the resistance heating element, regulates the temperature of the heat sink and thereby controls the temperature of the fuel exiting the labyrinth outlet.

6. A system as set forth in claim 5, wherein the temperature setting of the thermister is adjustable.

7. A system as set forth in claim 4, including a flow constricting valve in the proximity of the labyrinth inlet to help vaporize and increase turbulence of the fuel as it enters the labyrinth.

8. A system as set forth in claim 1, wherein the controlling means includes a flow control valve having a valve inlet in communication with an outlet for the fuel heating and vaporizing means, a valve outlet in communication with the carburetor float chamber, a valve passageway connecting the valve inlet to the valve outlet, a valve member situated and dimensioned to control the flow of fuel through the valve passageway, and means for moving the valve member with respect to the valve passageway, the valve moving means being responsive to ported vacuum pressure.

9. A system as set forth in claim 8, wherein the valve moving means includes a valve shaft connected at one end to the valve member, and a flexible diaphragm connected to the other end of the valve shaft, the flexible diaphragm being exposed on one side thereof to atmospheric pressure and on the other side thereof to ported vacuum pressure.

10. A system as set forth in claim 9, wherein the valve moving means further includes spring means biasing the diaphragm in a direction to cause the valve member to restrict flow through the valve passageway.

11. A system as set forth in claim 10, including means for adjusting the biasing force of the spring means.

12. A system as set forth in claim 8, wherein the valve passageway includes a rib on its surface to prevent complete closure of the flow control valve.

13. A pollutant control system for an internal combustion engine including, among other things, a fuel pump, an air intake means, and a carburetor having a fuel float chamber, an air/fuel mixing throat in communication with the air intake means, and passage means from the float chamber to the mixing throat, the pollutant control system comprising;
    means for heating and vaporizing fuel received from the fuel pump in a manner producing a predetermined mixture of liquid and vaporized fuel at an outlet of the heating and vaporizing means; and
    means for controlling the flow of the mixture of liquid and vaporized fuel from the heating and vaporizing means outlet to the float chamber, the controlling means being connected to ported vacuum pressure in the carburetor and responsive to that pressure to increase the flow of the mixture of liquid and vaporized fuel when the pressure decreases, and decrease the flow of the mixture of liquid and vaporized fuel when the pressure increases, whereby during an engine idle condition the float chamber will remain substantially full of liquid fuel and the liquid fuel escaping therefrom to the mixing throat is replenished with fuel heated by the heating and vaporizing means, and as the engine speed is increased the flow controlling means will cause the liquid fuel level to drop within the float chamber sufficiently to permit vaporized fuel to pass into the mixing throat for mixing with air drawn through the air intake means.

14. A system as set forth in claim 13, wherein the predetermined mixture of liquid and vaporized fuel produced by the fuel heating and vaporizing means comprises approximately 30% liquid fuel and approximately 70% vaporized fuel by volume.

15. A system as set forth in claim 14, wherein the temperature of the predetermined fuel mixture at the outlet of the heating and vaporizing means is within the range of 115° F. to 125° F.

16. A system as set forth in claim 13, including means for heating air drawn through the air intake means before entering the carburetor mixing throat, the heating means heating the air to a temperature within a range of 160° F. to 180° F.

17. A system as set forth in claim 16, including a free-wheeling fan situated within the air intake means to increase the turbulence of the air drawn into the carburetor mixing throat, whereby mixing of the air and fuel is enhanced to improve combustion within the engine.

18. A system as set forth in claim 13, wherein the fuel heating and vaporizing means includes:
    an electrical resistance heating element;
    a heat sink defining a labyrinth having an inlet and an outlet, fuel from the fuel pump passing into the inlet, and thence, after heat exchange with the heat sink, passing out of the outlet to the controlling means;
    fuel temperature sensing means which, in connection with a thermister controlling electrical input to the resistance heating element, regulates the temperature of the heat sink and thereby controls the temperature of the fuel exiting the labyrinth outlet, the temperature setting of the thermister being adjustable; and
    a flow constricting valve situated within the fuel flow path and in the proximity of the labyrinth inlet, to help vaporize and increase turbulence of the fuel as it enters the labyrinth.

19. A system as set forth in claim 13, wherein the controlling means includes:
    a flow control valve having a valve inlet in communication with an outlet for the fuel heating and vaporizing means;
    a valve outlet in communication with the carburetor float chamber;
    a valve passageway connecting the valve inlet to the valve outlet;
    a valve member situated and dimensioned to control the flow of fuel through the valve passageway; and
    means for moving the valve member with respect to the valve passageway, the valve moving means including a valve shaft connected at one end to the valve member, a flexible diaphragm connected to the other end of the valve shaft, the flexible diaphragm being exposed on one side thereof to atmospheric pressure and on the other side thereof to ported vacuum pressure;
    spring means biasing the diaphragm in a direction to cause the valve member to restrict flow through the valve passageway;
    means for adjusting the biasing force of the spring means; and
    means for preventing the complete closure of the flow control valve.

20. An air/fuel mixing system for an internal combustion engine, comprising:
    a carburetor having a venturi mixing throat, a fuel float chamber, and a fuel passageway from the float chamber to the mixing throat;
    means for channeling filtered air into the carburetor mixing throat;

means for conditioning fuel prior to entering the float chamber into a mixture of approximately 30% liquid fuel and approximately 70% vaporized fuel by volume, the fuel conditioning means including heating means for raising the temperature of the fuel mixture at the outlet of the fuel conditioning means to within the range of 115° F. to 125° F., wherein the fuel conditioning means comprises an electrical resistance heating element, a heat sink defining a labyrinth having an inlet and an outlet, fuel temperature sensing means which, in connection with a thermister controlling electrical input to the resistance heating element, regulates the temperature of the heat sink and thereby controls the temperature of the fuel exiting the labyrinth outlet, and a flow constricting valve sitated within the fuel flow path in the proximity of the labyrinth inlet to help vaporize and increase turbulence of the fuel as it enters the labyrinth; and means for controlling the level of liquid fuel in the float bowl, the controlling means insuring that the float chamber remains substantially full of liquid fuel during an engine idle condition whereby the liquid fuel escaping from the float chamber through the fuel passageway is replenished with fuel previously subjected to the conditioning means, the controlling means further permitting the liquid fuel level in the float chamber to drop as the engine speed is increased and allow vaporized fuel to pass through into the mixing throat for mixing with air drawn through the air channeling means.

21. A system as set forth in claim 20, wherein the air channeling means includes means for heating air drawn through the air channeling means to a temperature within the range of 160° F. to 180° F.

22. A system as set forth in claim 21, wherein the air heating means includes at least one resistance heating element situated within the air channeling means, the temperature of the resistance heating element being controlled by an air temperature sensing means situated downstream of the resistance heating element.

23. A system as set forth in claim 21, including a free-wheeling fan situated within the air channeling means to increase the turbulence of the air drawn into the carburetor mixing throat, whereby mixing of the air and fuel is enhanced to improve combustion within the engine.

24. A system as set forth in claim 20, wherein the controlling means is connected to ported vacuum pressure in the carburetor and responsive to that pressure to increase the flow of the mixture of fluid and vaporized fuel when the pressure decreases, and decrease the flow of the mixture of liquid and vaporized fuel when the pressure increases.

25. A system as set forth in claim 24, wherein the controlling means includes a flow control valve comprising:
a valve inlet in communication with an outlet for the fuel conditioning means;
a valve outlet in communication with the carburetor fuel float chamber;
a valve passageway connecting the valve inlet to the valve outlet;
a valve member situated and dimensioned to control the flow of fuel through the valve passageway;
means for moving the valve member with respect to the valve passageway, the valve moving means including a valve shaft connected at one end to the valve member, a flexible diaphragm connected to the other end of the valve shaft, the flexible diaphragm being exposed on one side thereof to atmospheric pressure and on the other side thereof to ported vacuum pressure within the carburetor, spring means biasing the diaphragm in a direction to cause the valve member to restrict flow through the valve passageway, and means for adjusting the biasing force of the spring means; and
means for preventing the complete occlusion of the valve passageway by the valve member.

26. A method of carbureting an internal combustion engine to reduce exhaust pollutants yet provide engine responsiveness to changes in carburetor throttling, the steps comprising:
heating the air drawn into the carburetor;
heating and vaporizing fuel prior to mixing the same with the heated air, into a partial liquid fuel/partial vaporized fuel mixture;
controlling the type and amount of heated fuel allowed to mix with the heated air drawn into the carburetor, this controlling step including the further steps of:
injecting heated liquid fuel into the carburetor during an engine idle condition when the throttle is closed,
as the throttle is opened, injecting additional quantities of heated liquid fuel into the carburetor momentarily, followed by injection of heated vaporized fuel into the carburetor, the heated vaporized fuel and the heated liquid fuel mixing with the heated air to form the explosive mixture needed for sustained engine operation, and
as the throttle is closed, decreasing the amount of heated vaporized fuel injected into the carburetor until only heated liquid fuel is injected when the throttle is completely closed;
wherein the type and amount of heated fuel allowed to mix with the heated air is determined, in part, by a flow control valve means interposed between the carburetor and the mixture of partially liquid fuel and partially vaporized fuel the flow control valve means being connected to ported vacumm pressure in the carburetor and responsive to that pressure to increase the flow of the partial liquid fuel/partial vaporized fuel mixture when the pressure decreases, and decrease the flow of the partial liquid fuel/partial vaporized fuel mixture when the pressure increases.

27. A method as set forth in claim 26, including the step of increasing the turbulence of the heated air drawn into the carburetor, to enhance mixing of the air and fuel and consequently improve combustion within the engine.

28. A method as set forth in claim 27, wherein the air drawn into the carburetor is heated to a temperature within the range of 160° F. to 180° F.

29. A method as set forth in claim 26, wherein the partial liquid fuel/partial vaporized fuel mixture comprises approximately 30% liquid fuel and approximately 70% vaporized fuel by volume at a temperature within the range of 115° F. to 125° F.

30. A method as set forth in claim 26, including the step of injecting additional quantities of heated liquid fuel into the carburetor as the throttle is further opened during acceleration and wide open engine operating conditions.

31. An air/fuel mixing system for an internal combustion engine, comprising:
- a carburetor having a venturi mixing throat, a fuel float chamber, and a fuel passageway from the float chamber to the mixing throat;
- means for channeling filtered air into the carburetor mixing throat;
- means for conditioning fuel prior to entering the float chamber into a mixture of approximately 30% liquid fuel and approximately 70% vaporized fuel by volume; and
- means for controlling the level of liquid fuel in the float bowl, the controlling means insuring that the float chamber remains substantially full of liquid fuel during an engine idle condition whereby the liquid fuel escaping from the float chamber through the fuel passageway is replenished with fuel previously subjected to the conditioning means, the controlling means further permitting the liquid fuel level in the float chamber to drop as the engine speed is increased and allow vaporized fuel to pass into the mixing throat for mixing with air drawn through the air channeling means, wherein the controlling means is connected to ported vacuum pressure in the carburetor and is responsive to that pressure to increase the flow of the mixture of liquid and vaporized fuel when the pressure decreases, and decrease the flow of the mixture of liquid and vaporized fuel when the pressure increases.

32. A system as set forth in claim 31, wherein the controlling means includes a flow control valve comprising;
- a valve inlet in communication with an outlet for the fuel conditioning means;
- a valve outlet in communication with the carburetor fuel float chamber;
- a valve passageway connecting the valve inlet to the valve outlet;
- a valve member situated and dimensioned to control the flow of fuel through the valve passageway;
- means for moving the valve member with respect to the valve passageway, the valve moving means including a valve shaft connected at one end of the valve member, a flexible diaphragm connected to the other end of the valve shaft, the flexible diaphragm being exposed on one side thereof to atmospheric pressure and on the other side thereof to ported vacuum pressure within the carburetor, spring means biasing the diaphragm in a direction to cause the valve member to restrict flow through the valve passageway, and means for adjusting the biasing force of the spring means; and
- means for preventing the complete occlusion of the valve passageway by the valve member.

* * * * *

UNITED STATES PATENT AND TRADEMARK OFFICE
CERTIFICATE OF CORRECTION

PATENT NO. : 4,711,222

DATED : December 8, 1987

INVENTOR(S) : Kelly R. Rawlings

It is certified that error appears in the above-identified patent and that said Letters Patent is hereby corrected as shown below:

In Column 3, line 26, delete the word "passage" and insert therefor --passages--.

In Column 3, line 48, delete the word "approxiamately" and insert therefor --approximately--.

In Column 6, line 4, delete the word "carburator" and insert therefor --carburetor--.

In Column 8, line 21, delete the word "inlett" and insert therefor --inlet--.

In Column 8, line 44, delete the number 126 and insert therefor --136--.

In Column 9, line 22, delete the word "restriotion" and insert therefor --restriction--.

In Column 9, line 28, insert the word "idle" between the words "that" and "condition."

In Column 9, line 45, delete the word "increse" and insert therefor --increase--.

UNITED STATES PATENT AND TRADEMARK OFFICE
CERTIFICATE OF CORRECTION

PATENT NO.    : 4,711,222

DATED         : December 8, 1987

INVENTOR(S)   : Kelly R. Rawlings

It is certified that error appears in the above-identified patent and that said Letters Patent is hereby corrected as shown below:

In Column 12, line 27, insert "outlet to the float chamber, the float controlling means" between the words "means" and "being."

In Column 15, line 16, delete the word "sitated" and insert therefor --situated--.

Signed and Sealed this

Second Day of August, 1988

*Attest:*

*Attesting Officer*

DONALD J. QUIGG

Commissioner of Patents and Trademarks